(12) United States Patent
Chernyavsky et al.

(10) Patent No.: US 8,633,424 B2
(45) Date of Patent: Jan. 21, 2014

(54) DISENGAGING PRESSURIZER BLOWER IN MAX HEAT SETTING TO IMPROVE CABIN HEATING

(75) Inventors: Leonid Chernyavsky, Glenview, IL (US); William H. Adamson, Napierville, IL (US); Alan G. Leupold, Plainfield, IL (US); Nicholas J. Prenger, Palos Heights, IL (US); Mark D. Klassen, Lockport, IL (US); Michael C. Bunnel, Clarendon Hills, IL (US)

(73) Assignee: CNH America LLC, New Holland, PA (US)

( * ) Notice: Subject to any disclaimer, the term of this patent is extended or adjusted under 35 U.S.C. 154(b) by 330 days.

(21) Appl. No.: 13/115,954

(22) Filed: May 25, 2011

(65) Prior Publication Data

US 2012/0125907 A1     May 24, 2012

Related U.S. Application Data

(60) Provisional application No. 61/417,121, filed on Nov. 24, 2010.

(51) Int. Cl.
*B60L 1/02* (2006.01)
*B60H 1/00* (2006.01)

(52) U.S. Cl.
USPC ............. 219/202; 219/208; 165/202; 165/42; 165/43; 165/234; 165/244; 165/247; 165/248; 454/70; 454/75; 454/158

(58) Field of Classification Search
USPC ................ 219/202; 165/202, 42–3, 234, 244, 165/247–8; 454/70, 75, 158
See application file for complete search history.

(56) References Cited

U.S. PATENT DOCUMENTS

| 3,421,576 | A | 1/1969 | Roane |
| 4,337,818 | A | 7/1982 | Franz |
| 4,344,356 | A | 8/1982 | Casterton et al. |
| 4,467,706 | A | 8/1984 | Batcheller et al. |
| 5,195,574 | A | 3/1993 | Tanaka et al. |
| 5,413,528 | A | 5/1995 | Pabst et al. |
| 5,984,773 | A | 11/1999 | Gervais et al. |
| 6,634,422 | B2 | 10/2003 | Rayburn et al. |
| 7,556,090 | B2 * | 7/2009 | Asai et al. ..................... 165/202 |
| 7,681,630 | B2 | 3/2010 | Klassen et al. |
| 2002/0153133 | A1 | 10/2002 | Haglid |

FOREIGN PATENT DOCUMENTS

JP      04090959 A     3/1992

* cited by examiner

*Primary Examiner* — Shawntina Fuqua
(74) *Attorney, Agent, or Firm* — Sue C. Watson

(57) ABSTRACT

An HVAC system for a work vehicle having an operator compartment for a vehicle operator, the system including a heating system, a compartment pressurizer blower, a compartment recirculation blower, a temperature sensor, and an operating mode switch, each operably coupled to an electronic circuit, wherein the circuit is configured to reduce pressurizer blower output when the operator selects high output from the heating system under certain predetermined temperature and conditions and operating modes to improve HVAC system performance.

9 Claims, 3 Drawing Sheets

DISENGAGING PRESSURIZER BLOWER IN MAX HEAT SETTING TO IMPROVE CABIN HEATING

CROSS-REFERENCE TO RELATED APPLICATIONS

This application claims the benefit of priority of U.S. Provisional Application 61/417,121, filed Nov. 24, 2010.

BACKGROUND OF THE INVENTION

The present invention relates to a cab ventilation system for an off-road work vehicle, and more particularly to control strategy for a cab ventilation system that will enhance heating capacity during low ambient temperature conditions.

Many agricultural work vehicles feature operator compartments that are enclosed with large glass or plastic panels that extend substantially the entire way around the operator. The large panels enclose the operator and protect the operator from the elements. Such operator cabs feature large internal volumes and equally expansive exterior surfaces, usually of transparent panels, which imposes additional challenges to maintaining the compartment at an comfortable temperature.

Work vehicles may have a pressurizer fan or blower which further burdens the compartment heating and cooling system. Vehicles so equipped, such as tractors or combines, generally have two blowers, one blower for pressurizing the operator compartment with outside air and the other blower for recirculating air within the operator compartment. The purpose of the pressurizer blower is to provide a slight positive pressure in the operator compartment to ensure that no air is drawn into the operator compartment through cracks or gaps in the ceiling, walls, or floor of the operator compartment. A positive pressure of about 6 to 25 mm of water is sufficient to prevent dirty, dusty air from infiltrating into the compartment, degrading air quality inhaled by the operator, dirtying the interior and possibly fouling operator controls. The work vehicle may have many small air leaks located in and around the compartment, thus the pressurizer blower may introduce a significant amount of outside air into the operator compartment in order to maintain the necessary slightly positive pressure inside the compartment.

Heating the operator compartment may be further compromised by the limited capacity of the heating source on vehicles having advance emission controls (e.g., a Tier 4 engine using selective catalytic reduction) or low horsepower engines. During compartment heating operations when the ambient temperature is very low, the ability of the heating system to warm the compartment air is marginal, especially soon after the engine is first started when engine coolant temperature is low. A large influx of outside air through the pressurizer blower only worsens operator compartment heating performance.

It would be a great advantage to provide an HVAC system for a work vehicle that disengages the pressurizer blower and reduces the quantity of outside air introduced into the operator compartment during low ambient temperature conditions and periods of maximum heating demand. Further advantages would be realized by a system capable of monitoring one or more vehicle and HVAC system parameters and disengaging the pressurizer blower when certain predetermined permissive conditions are satisfied. These and other objects are satisfied by the invention described below.

SUMMARY OF THE INVENTION

Accordingly, the present invention, in any of the embodiments described herein, may provide one or more of the following advantages:

It is an object of the present invention to provide an HVAC system for a work vehicle, the vehicle having an operator compartment for a vehicle operator, the system including a heating system, an operator compartment pressurizer blower, a temperature sensor, and an electronic circuit coupled to the heating system, the temperature sensor, and the pressurizer blower, wherein the circuit is configured to reduce pressurizer blower output when the operator selects high output from the heating system under certain temperature conditions.

The electronic circuit may be an electronic control unit including a microprocessor. The system may further include a manually operable temperature control for selecting among a plurality of air temperatures, wherein the control is coupled to the electronic circuit. The high output may be selectable by manual operation of the temperature control. The system may further include a recirculation blower disposed to draw air from the operator compartment, draw air through heating coils, and expel air back into the operator compartment. The temperature sensor may be configured to sense the temperature of the heat source for the heating system. The electronic circuit may be configured to reduce pressurizer blower output when the operator both selects high output from the air-conditioning system and selects high output from the recirculation blower while the heat source temperature is below a pre-determined threshold.

It is another object of the present invention to provide an HVAC system for a work vehicle, the vehicle having an operator compartment for a vehicle operator, the system including a heating system with a compartment defog mode of operation, an operator compartment pressurizer blower, a temperature sensor, and an electronic circuit coupled to the heating system, the temperature sensor, and the pressurizer blower, wherein the circuit is configured to reduce pressurizer blower output when the operator selects high output from the heating system under certain temperature and defog mode conditions.

The electronic circuit may be an electronic control unit including a microprocessor. The system may include a manually operable temperature control for selecting among a plurality of air temperatures, wherein the control is coupled to the electronic circuit. The system may further include a manually operable defog control for selecting a defog mode of operation of the heating system. The high output may be selectable by manual operation of the temperature control. The system may further include a recirculation blower disposed to draw air from the operator compartment, draw air through heating coils, and expel air back into the operator compartment. The air may be specially re-directed toward select interior surfaces of the operator compartment when the system defog mode is selected. The temperature sensor may be configured to sense the temperature of the heat source for the heating system. The electronic circuit may be configured to reduce pressurizer blower output when the operator both selects high output from the air-conditioning system and selects high output from the recirculation blower while the heat source temperature is below a pre-determined threshold provided that the defog mode of operation has not been selected.

It is a further object of the present invention to provide an HVAC system for a work vehicle, the vehicle having an operator compartment for a vehicle operator, the system including a heating system with a compartment defog mode of operation, an operator compartment pressurizer blower, a temperature sensor, and an electronic circuit coupled to the heating system, the temperature sensor, and the pressurizer blower, wherein the circuit is configured to maintain pressurizer blower output when the operator selects high output from the heating system while the heating system is operating in the defog mode.

It is a further object of the present invention to provide an HVAC system for a work vehicle, the vehicle having an operator compartment for a vehicle operator, the system including a heating system with an operator-selectable compartment defog mode of operation, an operator compartment pressurizer blower, a temperature sensor configured to sense the temperature of the heat source for the heating system, and an electronic circuit coupled to the heating system, the temperature sensor, and the pressurizer blower, wherein the circuit is configured to maintain pressurizer blower output when the operator selects high output from the heating system while the heating system is operating in the defog mode.

It is a further object of the present invention to provide an HVAC system for a work vehicle, the vehicle having an operator compartment for a vehicle operator, the system including a heating system with an operator-selectable compartment defog mode of operation, an operator compartment pressurizer blower, a temperature sensor configured to sense the temperature of the heat source for the heating system, and an electronic circuit coupled to the heating system, the temperature sensor, and the pressurizer blower, wherein the circuit is configured to maintain pressurizer blower output when the operator selects high output from the heating system while the temperature sensor senses a heating source temperature in excess of a pre-determined threshold.

It is a still further object of the present invention to provide an HVAC system for a work vehicle, the vehicle having an operator compartment for a vehicle operator, the system including a heating system, an operator compartment pressurizer blower, an operator compartment recirculation blower with a manually operable control for adjusting the blower output, a temperature sensor configured to sense the temperature of the heat source for the heating system, and an electronic circuit coupled to the heating system, the temperature sensor, the recirculation blower control, and the pressurizer blower, wherein the circuit is configured to maintain pressurizer blower output when the recirculation blower is operating at less than a pre-determined output.

It is a still further object of the present invention to provide an HVAC system for a work vehicle, the vehicle having an operator compartment for a vehicle operator, the HVAC system including a heating system, an operator compartment pressurizer blower, an operator compartment recirculation blower, a temperature sensor, and an electronic circuit operably coupled to the heating system, the temperature sensor, the recirculation blower, and the pressurizer blower, wherein the circuit is configured to reduce pressurizer blower output under certain pre-determined HVAC operating conditions in order to maximize heating of the operator compartment that is durable in construction, inexpensive of manufacture, carefree of maintenance, easily assembled, and simple and effective to use.

These and other objects are achieved by providing an HVAC system for a work vehicle having an operator compartment for a vehicle operator, the system including a heating system, a compartment pressurizer blower, a compartment recirculation blower, a temperature sensor, and an operating mode switch, each operably coupled to an electronic circuit, wherein the circuit is configured to reduce pressurizer blower output when the operator selects high output from the heating system under certain predetermined temperature and conditions and operating modes.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right," "up" or "down," or "top" or "bottom" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
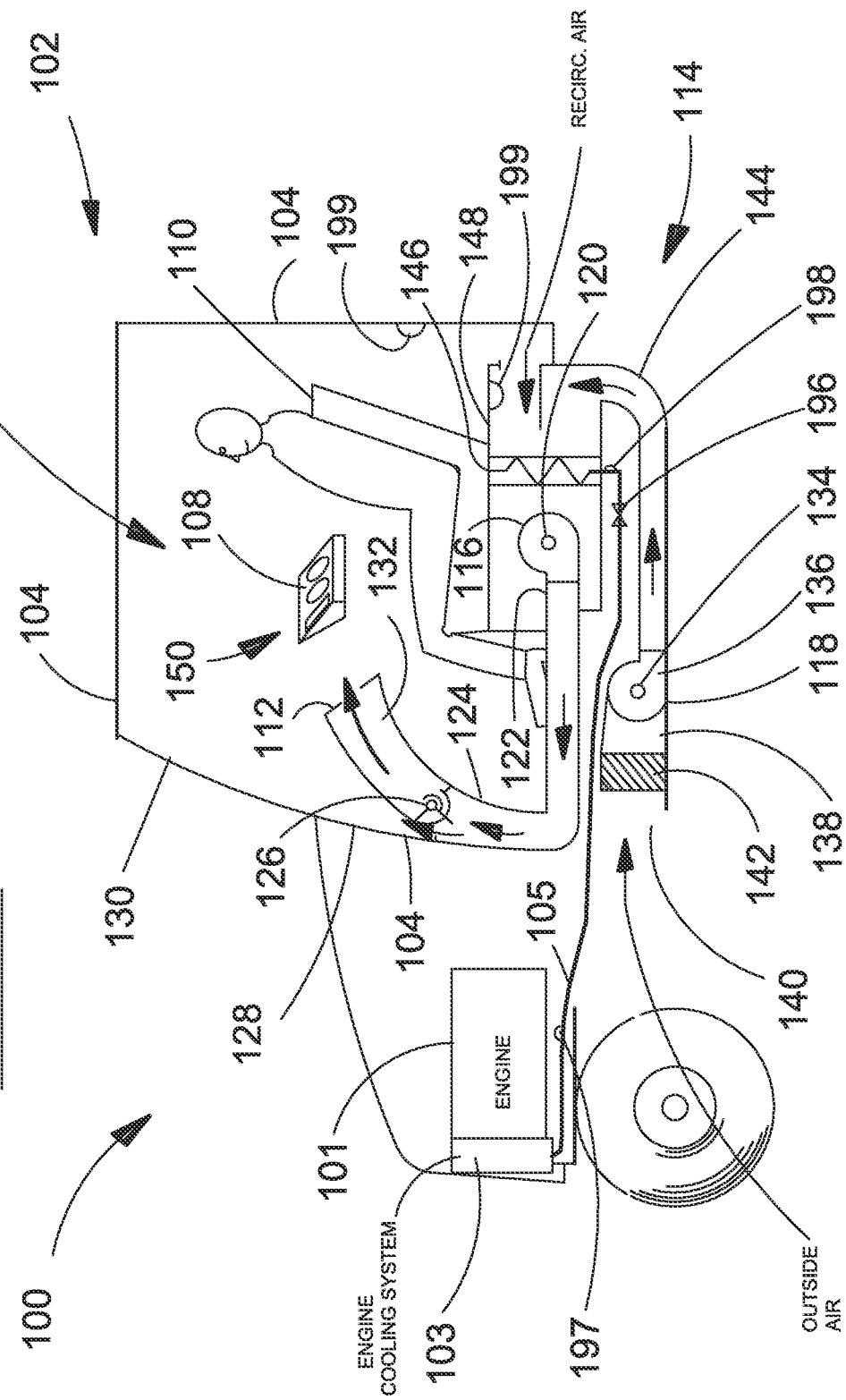
FIG. 1 is a schematic left side view of the operator compartment of a work vehicle in accordance with the present invention.

First referring to FIG. 1, there is illustrated a work vehicle 100 including an engine 101 with a cooling system 103. Work vehicle 100 is further provided with an operator compartment 102 having walls 104 that enclose an operator station 106. Operator station 106 includes operating console 108, seat 110, and dashboard (or front console) 112. Ventilating air conduits 114 are in fluid communication with the bottom of operator compartment 102 to conduct outside air into the upper compartment 102 and to recirculate air within operator compartment 102.

Air is driven through conduits 114 by a recirculation fan 116 and a pressurizer fan 118. Recirculation fan 116 has an inlet 120 that is disposed inside operator compartment 102 to receive air from inside the operator compartment. Recirculation fan 116 receives this air at its inlet 120, pressurizes it, and transmits it to its outlet 122. From outlet 122, recirculation fan 116 blows the air through conduit 124. The air travels through conduit 124 along the floor of the operator compartment up the front wall, and is directed by a mode door 126 into one of two paths. The first path 128 directs the air upward along the front windshield 130 of the operator compartment 102, in what is referred to as a defog mode. The second path 132 directs the air through the dashboard 112 and toward the operator. The operator may selectively control the discharge of the air, directing it toward the floor, the seating area, or the windshield.

Pressurizer fan 118 has an inlet 134 and an outlet 136. Pressurizer fan 118 is configured to receive air from inlet air conduit 138 which itself has an inlet 140 in fluid communication with the outside atmosphere. Air conduit 138 also has a fresh air filter 142 disposed therein, which filters incoming atmospheric air. The outlet of pressurizer fan 118 is in fluid communication with an outlet conduit 144, which in turn conducts air from the pressurizer fan into operator compartment 102.

Recirculation fan 116 draws air through heater and evaporator coils 146, which are disposed in inlet air conduit 148 of recirculation fan 116. By controlling the minimum evaporator temperature and/or hot coolant flow rate conducted through heater coils 146, and by controlling the speed of recirculation fan 116 and pressurizer fan 118, the operator in "manual" mode or the system in "auto" mode is able to tailor the temperature of operator compartment 102 to suit the operator. The heater and evaporator coils 146 may be disposed adjacent to each other as shown in FIG. 1. In an alternative embodiment, however, they may be spaced apart. They may also be disposed in different air ducts.

The operator controls the temperature of the compartment by manipulating individual operator controls 150 disposed in operating console 108. These controls are shown in more detail in FIG. 2.

Figure 2:
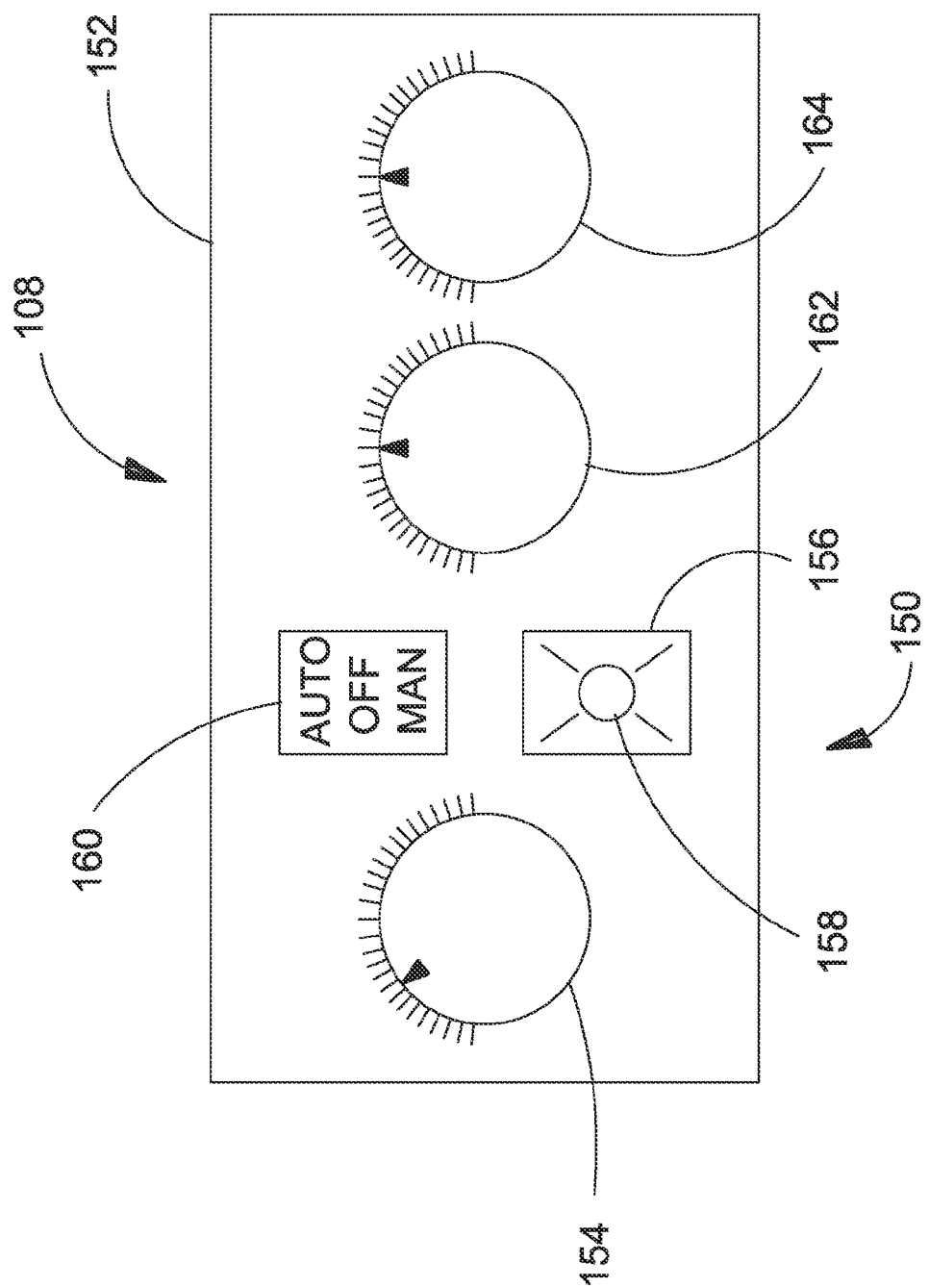
FIG. 2 is a detailed view of an operating console for operating the HVAC system of the work vehicle.

Referring now to FIG. 2, the operating console 108 includes a front panel 152 on which controls 150 are mounted. Controls 150 include a blower speed control 154 that is manually operable to select a plurality of different blower speeds. Controls 150 may also include a defog switch 156 and a defog indicator light 158. Defog switch 156 is a momentary contact switch, configured to turn defog (also known as "dehumidify") function on or off. The defog indicator light 158 is configured to indicate when the HVAC system has responded to operator manipulation of defog switch 156 and is defogging/dehumidifying the air.

Controls 150 also include an auto/off/manual switch 160 which is a three position detected toggle switch. The three positions correspond to three modes of operation of the HVAC system: "auto", "manual", and a central "off" position through which the switch must travel when switched between "auto" and "manual". The auto/off/manual switch 160 includes suitable visual indicia to indicate to the operator the modes of operation that can be selected by manipulating switch 160.

Controls 150 also include a temperature control 162 that permits the operator to select cabin temperature. In "manual" mode temperature control 162 has two ranges, a lower or "cooling" range of positions that causes the HVAC system to cool the operator compartment using the air conditioner, and an upper or "heating" range causes the HVAC system to heat the operator compartment using hot coolant from the engine 101 supplied to the heating coils 146 in the operator compartment via engine coolant conduits 105 (refer to FIG. 1). In "auto" mode, an operator can select one of a plurality of different cab set temperatures at which the cab will be maintained, whether by heating or by cooling.

The final control of controls 150 is mode door control 164. Using this control, the operator controls the position of mode door 126 to direct air toward the operator's feet, toward the operator's face, or toward the windshield 130 of the vehicle.

The controls shown in operating console 108 are coupled to a control circuit 165 to control the operation of fans 116, 118, heater and evaporator coils 146, and mode door 126. Control circuit 165 is shown in detail in FIG. 3.

Figure 3:
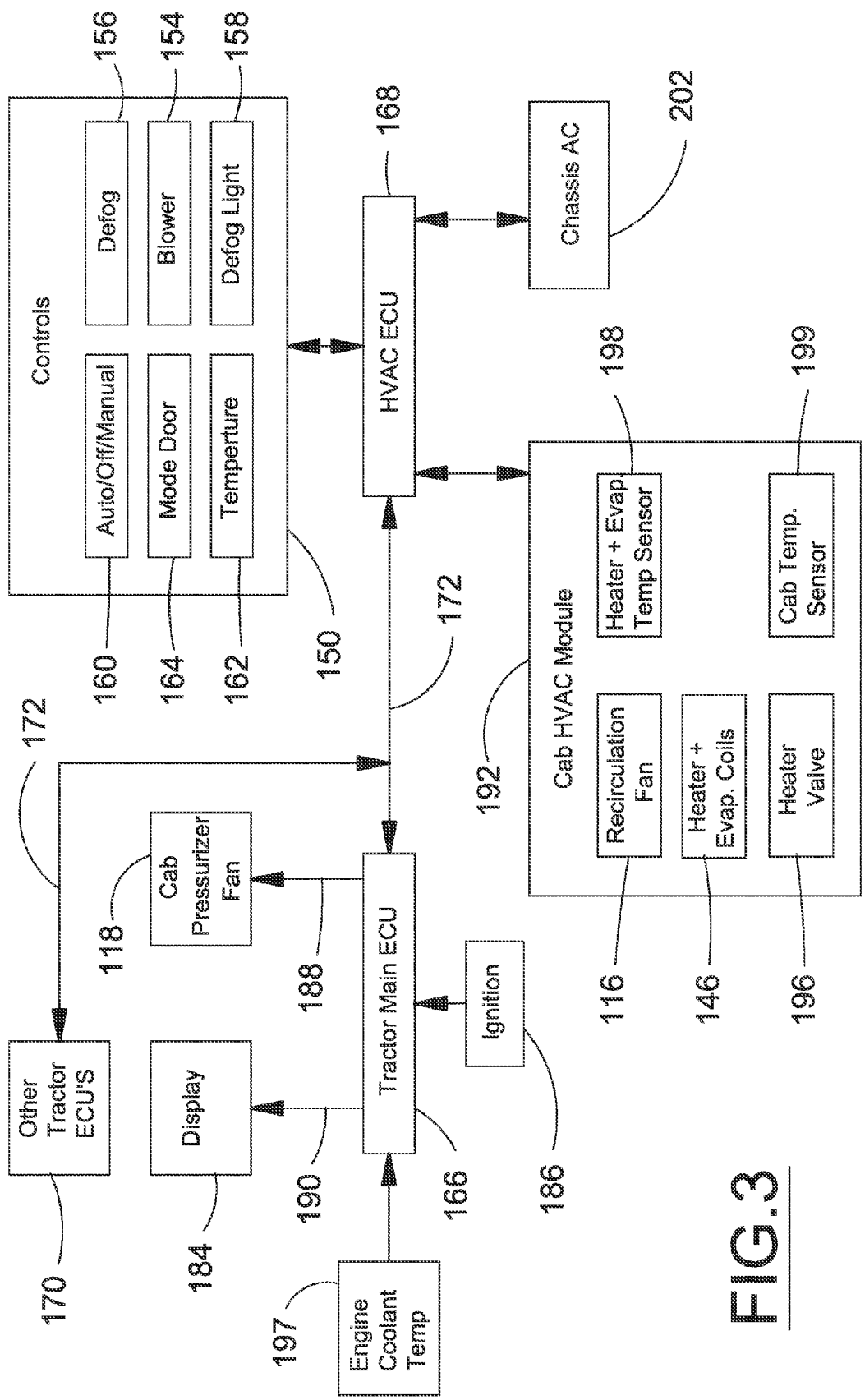
FIG. 3 is a schematic diagram of an electronic circuit for controlling the HVAC system of the work vehicle.

Referring now to FIG. 3, control circuit 165 includes several microprocessor-based electronic control units (ECU) 166, 168, 170 that are coupled together over a digital communications bus 172. While the preferred embodiment illustrated herein uses three interconnected ECU's, the functions performed by these three ECU's may be distributed between one or more ECU's. Thus, one or more ECU's may be substituted for the three interconnected ECU shown herein. Additional details on the configuration and operation of the ECU's is disclosed in U.S. Pat. No. 7,681,630 issued to Klassen, et al., incorporated in entirety herein by reference.

ECUs 166, 168, 170 are coupled together over a bus 172 to transmit status and control information from one ECU to another ECU. Tractor main ECU 166 is coupled to a display 184, to cabin pressurizer blower 118 as well as to an ignition circuit 186. ECU 166 (or any of the other tractor ECUs) may also receive an engine coolant temperature signal from coolant temperature sensor 197. The engine coolant temperature may then be communicated over bus 172 for use by any of the other ECU's in the system. ECU 166 controls the speed of pressurizer fan 118 by transmitting control signals over control lines 188. ECU 166 selects what is displayed on display 184 by transmitting control signals over control lines 190. ECU 166 receives control signals from ignition circuit 186. The signals generated by ignition circuit 186 indicate that the operator has turned the work vehicle "on" or "off" with the ignition key.

HVAC ECU 168 is primarily responsible for communicating with the heating components, air-conditioning components, and HVAC controls components of the system. ECU 168 is coupled to cabin HVAC module 192, which responsively controls recirculation blower 116, and heater valve 196. HVAC module 192 monitors temperature sensors 198, 199, and provides ECU 168 with an indication of their status.

HVAC ECU 168 is coupled to controls 150. ECU 168 is configured to monitor the fan speed control 154 to determine the operator's desired blower speed. ECU 168 is configured to monitor defog switch 156 to determine the operator's desired defog setting. ECU 168 is configured to turn defog indicator light 158 on and off in response to operator manipulation of defog switch 156. ECU 168 is also configured to monitor auto/off/manual switch 160 and change the mode of operation of the HVAC system between "off", "manual", and "automatic" in response to operator manipulation of that switch. ECU 168 is configured to control the air conditioner 202 and the HVAC module 192 to change the temperature of the recirculated air passing through heater and evaporator coils 146 in response to operator manipulation of temperature control 162.

When ambient temperature conditions are low and after the work vehicle has been shut down for a long period of time, the cabin may be extremely cold. In this case, the operator typically enters the operator's cab, starts the vehicle, and turns the heater "on" to request maximum heating. In the present system, maximum heating is requested by placing the auto/off/manual switch 160 in the "auto" position, and rotating the temperature control 162 to its extreme clockwise position, which indicates maximum heating. The operator can also request maximum heating by placing the auto/off/manual switch in "manual" position, rotating the blower speed control 154 all the way clockwise to its maximum recirculation blower speed position (or at least 95% of its maximum), and rotating the temperature control 162 to its extreme clockwise position, which indicates maximum heating. Either of the above described control selections represent a maximum heating request, to which the system responds by providing the maximum heating available and by reducing or eliminating the output of the pressurizer blower. Regardless of whether automatic or manual control is selected, maximum heating also requires that the defog switch 156 be de-selected. This is called a MAX HEATING selection.

In response to the operator's request for maximum heating by setting the controls to their MAX HEATING settings, HVAC ECU 168 is configured to command HVAC module 192 to turn recirculation blower 116 on to its maximum speed. HVAC ECU 168 is further configured to check the status of the defog switch 156 and the engine coolant temperature whether by sensor 197 from the engine controls or by sensor 198 from the heating coils 146.

To ensure that the operator receives the maximum heating effect, HVAC ECU 168 is also configured to disable the pressurizer fan 118 under certain conditions. The pressurizer fan 118 in the vehicle is intended to maintain a slight positive air pressure (6 mm to 25 mm of water) inside the operator compartment to ensure that dust and dirt from the outside environment is not drawn into the operator cab and deposited on the various controls and surfaces. The pressurizer fan 118 helps keep the cab clean and the controls operating properly. Since the pressurizer fan 118 draws its air from the outside environment, maintaining this slight operator compartment air pressure can require a substantial flow of cold outside air into the operator compartment. Operation of the recirculation fan 116 at maximum output will draw in sufficient air from the pressurizer inlet 140 to maintain a slight positive pressure within the operator compartment 102 without operation of the pressurizer fan 118. Thus, MAXIMUM HEATING requires that the recirculation fan 116 be operating at or above 95% in order to assure that the slight (approximately 6 mm of water) operating pressure necessary to prevent contamination in-leakage into the operator compartment while the operation of the pressurizer fan 118 is suspended. The HVAC ECU will not suspend operation of the pressurizer fan 118 if the recirculation fan 116 is operating at less than 95% of capacity.

The cold outside air injected into the operator compartment by pressurizer fan 118 works directly against the efforts of the HVAC system to heat the operator compartment as rapidly as possible, especially during the times when engine coolant temperature has not yet reached its normal operating range or remains low due to extremely low ambient temperature conditions. For this reason, HVAC ECU 168 is configured to turn the pressurizer fan 118 "off" when the operator requests MAX HEATING under certain conditions. ECU 168 does this by checking the status of the defog switch 156 and the engine coolant temperature whether by sensor 197 from the engine controls or by sensor 198 from the heating coils 146. If the defog switch 156 is set to "off" and the engine coolant temperature is below a pre-determined threshold, preferably 75 C., ECU 168 will transmit a fan command over CAN bus 172 to tractor main ECU 166. Tractor main ECU 166 is configured to signal pressurizer fan 118 over control lines 188, commanding it to turn off. With pressurizer fan 118 turned off, the air flow rate forced into the operator compartment is minimized 102 to improve cab heating. Since in maximum heating setting the recirculation fan 116 is commanded to operate at maximum speed, sufficient amount of fresh air enters the cab to provide minimum cab pressurization of 6 mm of water, which provides protection from dust ingress into the cab.

As the engine warms and engine coolant temperature increases, available heat for operator compartment heating becomes sufficient to overcome the inflow of outside air from the pressurizer blower. When ECU 168 senses that engine coolant temperature has reached a normal operating range, preferably at least 78 C., operation of the pressurizer fan 118 is allowed to resume. Similarly, if the defog/dehumidification mode of operation is selected by defog switch 156, ECU 168 permits operation of the pressurizer fan 118 in order to provide for most efficient dehumidification of the operator compartment.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. An HVAC system for a work vehicle having an operator compartment for a vehicle operator, the system comprising:
   a heating system having a heater coil;
   an operator compartment pressurizer blower;
   an operator compartment recirculation blower; and
   a control circuit operably coupled to said heating system, said pressurizer blower, and said recirculation blower, wherein said control circuit is configured to disengage said pressurizer blower when the operator selects a maximum heat setting of said heating system, and wherein said control circuit is further configured to disengage said pressurizer blower only when said recirculation blower is set to a maximum recirculation blower speed.

2. The HVAC system of claim 1, further comprising a heater coil temperature sensor configured to sense the temperature of said heater coil and relay a signal indicative of heater coil temperature to said control circuit, said control circuit further being configured to disengage said pressurizer blower only when said heater coil temperature signal is less than a pre-determined value.

3. The HVAC system of claim 2, further comprising a selectively operable dehumidification mode of operation, said control circuit being configured to disengage said pressurizer blower only when said dehumidification mode of operation is not selected.

4. A method for improving performance of an HVAC system for a work vehicle, the vehicle having an operator compartment for a vehicle operator, the method comprising the steps of:
   providing a heating system for the operator compartment having a heater coil;
   providing an operator compartment pressurizer blower;
   providing an operator compartment recirculation blower;
   providing a control circuit operably coupled to the heating system, the pressurizer blower, and the recirculation blower;
   selecting, by the operator, a maximum heat setting of the heating system; and
   disengaging, by the control circuit, the pressurizer blower only when the recirculation blower is set to a maximum recirculation blower speed.

5. The method of claim 4, further comprising the steps of:
   providing a heater coil temperature sensor configured to sense the temperature of the heater coil and relay a signal indicative of heater coil temperature to the control circuit; and
   disengaging, by the control circuit, the pressurizer blower only when the heater coil temperature signal is less than a pre-determined value.

6. The method of claim 5, further comprising the steps of:
   providing a selectively operable dehumidification mode of operation; and
   disengaging, by the control circuit, the pressurizer blower only when the dehumidification mode of operation is not selected.

7. In a work vehicle having an operator compartment for a vehicle operator, the operator compartment further having an HVAC system, the improvement in the HVAC system comprising:
   a heating system having a heater coil;

an operator compartment pressurizer blower configured to draw air from outside of the operator compartment and expel air into the operator compartment;

an operator compartment recirculation blower configured to draw air from inside the operator compartment, through said heater coil, and expel air into the operator compartment; and a control circuit operably coupled to said heating system, said pressurizer blower, and said recirculation blower, wherein said control circuit is configured to disengage said pressurizer blower when the operator selects a maximum heat setting of said heating system, and wherein said control circuit is further configured to disengage said pressurizer blower only when said recirculation blower is set to a maximum recirculation blower speed.

8. The improvement of claim 7, further comprising a heater coil temperature sensor configured to sense the temperature of said heater coil and relay a signal indicative of heater coil temperature to said control circuit, said control circuit further being configured to disengage said pressurizer blower only when said heater coil temperature signal is less than a predetermined value.

9. The improvement of claim 8, further comprising a selectively operable dehumidification mode of operation, said control circuit being configured to disengage said pressurizer blower only when said dehumidification mode of operation is not selected.

* * * * *